United States Patent [19]

Blier

[11] Patent Number: 5,227,263

[45] Date of Patent: Jul. 13, 1993

[54] RECONFIGURABLE HEAVY DUTY BATTERY HOLDER

[75] Inventor: Darren J. Blier, Westerly, R.I.

[73] Assignee: The United States of America as represented by the Secretary of the Navy, Washington, D.C.

[21] Appl. No.: 892,067

[22] Filed: May 22, 1992

[51] Int. Cl.[5] .............................................. H01M 2/10
[52] U.S. Cl. ........................................ 429/99; 429/100
[58] Field of Search ...................... 429/1, 97, 99, 100, 429/121

[56] References Cited

U.S. PATENT DOCUMENTS

| | | | |
|---|---|---|---|
| 1,604,872 | 10/1926 | Baird | 429/99 |
| 1,624,131 | 4/1927 | Bobbitt | 429/99 X |
| 1,887,811 | 11/1932 | Ikin | 429/99 |
| 5,104,752 | 4/1992 | Baughman et al. | 429/1 |

Primary Examiner—Stephen Kalafut
Attorney, Agent, or Firm—Michael J. McGowan; Prithvi C. Lall; James M. Kasischke

[57] ABSTRACT

A reconfigurable heavy duty battery holder which holds a plurality of standard sized battery cells. The device has removable plates and detachable leads to allow the user to reconfigure the device to provide different currents and voltages. The device comprises a body with a plurality of chambers for batteries, two end caps at either end of the body, and contacts at the end of each chamber electrically connected with terminals on the exterior of each end. Terminals allow attachment of either a connector plate or a lead. The user can select the voltage and current available by changing the position of the leads and connector plates. The body and ends provided are durable enough to withstand heat generated by high current demands and stress caused by frequent replacement of battery cells.

8 Claims, 3 Drawing Sheets

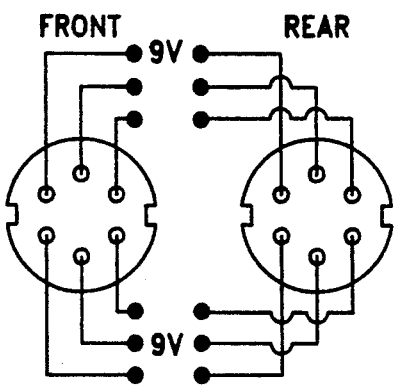
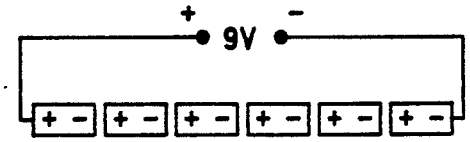
FIG. 3
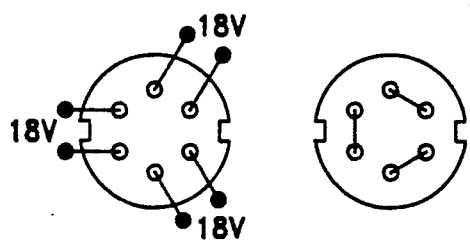
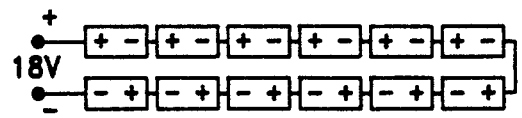
FIG. 4
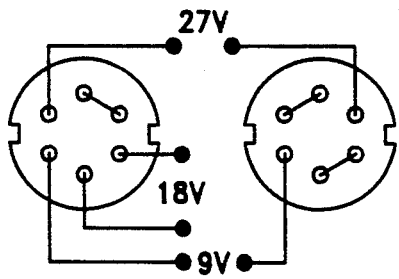
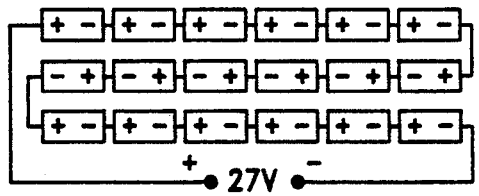
FIG. 5
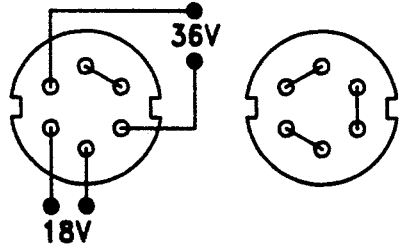
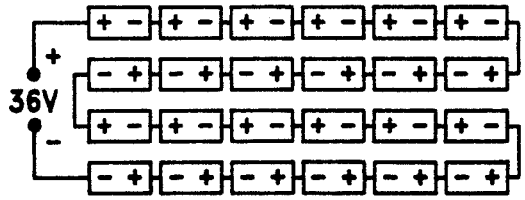
FIG. 6
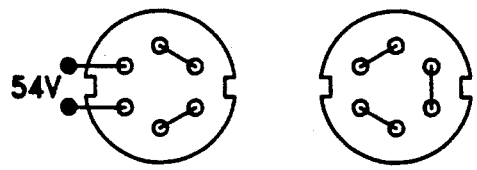
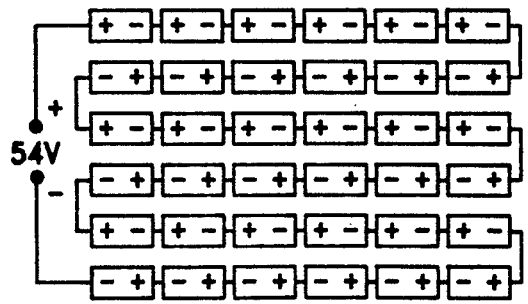
FIG. 7

RECONFIGURABLE HEAVY DUTY BATTERY HOLDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a battery holder and more particularly to an apparatus for holding batteries which is extremely durable, which can be easily reconfigured to provide different currents and voltages, and which can be replaced quickly and easily.

(2) Description of the Prior Art

Many types of battery holders are commercially available for standardized battery sizes. These holders are often lightweight brackets for holding a plurality of batteries in series or in parallel to provide a fixed voltage. In most commercial battery holders, batteries are installed from the sides and retained by resilient elastomeric members on the side of the holder. Some battery holders, such as those in flashlights, allow the user to remove one end and slide out the batteries.

Most existing battery holders are designed to be permanently affixed to an electrical device. Easily replaceable cartridge type battery holders do exist, but they are often customized to fit a specific device. Generally, to use a prior art battery holder, the user must solder power leads to the contacts of the holder. The holder is thus connected to the electrical device and cannot be removed without removing the soldered leads.

The features of available battery holders create several problems in heavy duty applications. Batteries are difficult to replace because the battery holder is fastened to a test object and batteries often must be inserted from both sides of the holder. Furthermore, available battery holders are not rigid enough to withstand heavy use without deforming. Frequent replacement of batteries into resilient holders eventually results in loss of resiliency in the member retaining the batteries. Another deficiency is that when batteries are linked in parallel to satisfy a high current demand, currently available holders often deform because of the generated heat.

In a test apparatus the user often needs several different voltages to power different circuits. While an apparatus is in the development stage, voltage requirements may change frequently. Because commercially available battery holders do not facilitate reconfiguration of the power supply as the voltage and current demands of the test device change, each time an electrical requirement changes, the user must remove the soldered leads from the old battery holder and solder the leads to a new battery holder.

SUMMARY OF THE INVENTION

Accordingly, it is a general purpose and object of the present invention to provide a battery holder for test assemblies.

It is a further object that this battery holder be of heavy duty construction, so that the holder does not deform when subjected to extended use, harsh environments or high temperatures.

Another object is that this battery holder allow replacement of batteries easily without detaching power leads.

Still another object is that this battery holder be reconfigurable to provide differing voltages and current levels without great effort or expense.

These objects are accomplished with the present invention by providing a heavy duty battery holder with a plurality of longitudinal battery chambers and removable end caps. The diameter and length of the battery chambers allow containment of a plurality of standard sized batteries in series in each chamber. Fasteners are provided on the end caps of the battery holder to allow installation of power leads or connector plates. Batteries can be removed by unscrewing the end caps and allowing the batteries to slide free of the holder. New batteries are then slid into the chambers. The battery holder is constructed of a rigid dielectric material, such as polypropylene, to prevent deformation because of hard use or heat. The battery holder can be reconfigured to provide a greater voltage or current by changing the arrangement of connectors, leads, and batteries to produce the desired voltage and current.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawings wherein:

FIG. 1A shows a cutaway detail view of part of an end cap of the battery holder.

FIG. 3 shows a diagram of the battery holder end caps configured to provide six 9 volt power supplies and a circuit diagram for one 9 volt power supply;

FIG. 4 shows a diagram of the battery holder end caps configured to provide three 18 volt power supplies and the circuit diagram for one 18 volt power supply;

FIG. 5 shows a diagram of the battery holder end caps configured to provide one 27 volt power supply, one 18 volt power supply and one 9 volt power supply and a circuit diagram for one 27 volt power supply;

FIG. 6 shows a diagram of the battery holder end caps configured to provide one 36 volt power supply and one 18 volt power supply and a circuit diagram for one 36 volt power supply;

FIG. 7 shows a diagram of the battery holder end caps configured to provide one 54 volt power supply and a circuit diagram for one 54 volt power supply.

DESCRIPTION OF THE PREFERRED EMBODIMENT

Figure 1:
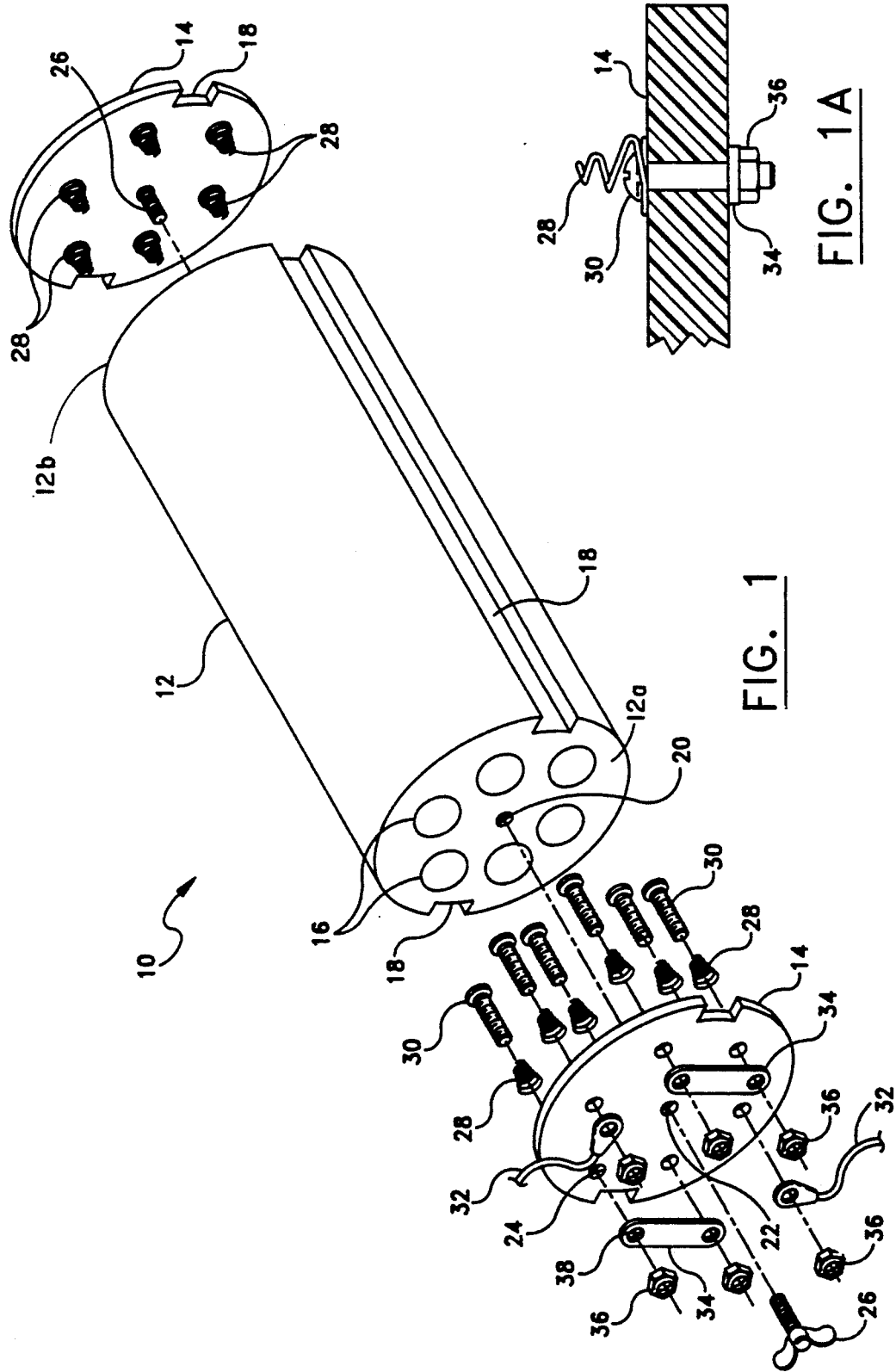
FIG. 1 shows an exploded perspective view of a reconfigurable heavy duty battery holder of the current invention.

Referring now to FIG. 1 there is shown an exploded perspective view of a battery holder 10 comprising a cylindrical body 12 and two end caps 14.

The body 12 of the battery holder 10 is cylindrical in shape with a plurality of longitudinal battery chambers 16 spaced radially about the axis of the cylinder, two longitudinal mounting grooves 18 formed on opposite sides of body 12, two faces 12a and 12b disposed orthangonally to the axis of the cylinder on each end of cylindrical body 12, and an internally threaded axial fastening aperture 20 at the center of each face of body 12. Battery chambers 16 have a diameter allowing a standard sized cylindrical battery cell (not shown) to slide in the chamber and a length allowing the required number of standard cells to fit therein and contact electrical connectors on end caps 14.

End caps 14 are disk shaped of substantially the same diameter as body 12 with mounting grooves 18 on opposite sides of cap 14 corresponding to mounting grooves 18 on body 12. End caps 14 comprise a central fastening opening 22 and a plurality of contact apertures 24 spaced radially around the center of end cap 14 matching battery chambers 16 in body 12. Each end cap 14 is fastened to body 12 by use of a threaded fastener 26 passing through central fastening opening 22 and engaging body 12 at body fastening aperture 20.

A plurality of contact springs 28 are fastened to the body side of end caps 14 by bolts 30, each bolt 30 engaging contact spring 22 between the head of bolt 30 and end cap 14. Bolt 30 passes through contact aperture 24, joins a power lead 32 or a connector plate 34 or both as configured by the user, and ultimately is engaged by a nut 36. Connector plates 34 are conductive rectangular plates with two connection apertures 38 located therein at each end of the broad face of the plate 34 and extending therethrough. Connection apertures 38 are positioned to allow adjacent bolts 30 to extend therethrough and create an electrical connection between contact spring 28 and power lead 32 or connector plate 34.

In the preferred embodiment body 12 is made from polypropylene and end caps 14 are made from fiber glass plate, but these components can be made of any dielectric material. In a harsh environment battery holder 10 may be constructed of metal with electrical insulation thereon to prevent electrical current leakage.

In FIG. 1A there is shows a cutaway detail view of part of an end cap of the battery holder. A portion of end cap 14 is shown in cross section. Bolt 30 is shown extending through end cap 14 and being retained on one side of end cap 14 by nut 36. Connector plate 34 is retained on bolt 30 between end cap 14 and nut 36. Contact spring 28 is retained on the other side of cap 14 between cap 14 and the head of bolt 30.

Figure 2:
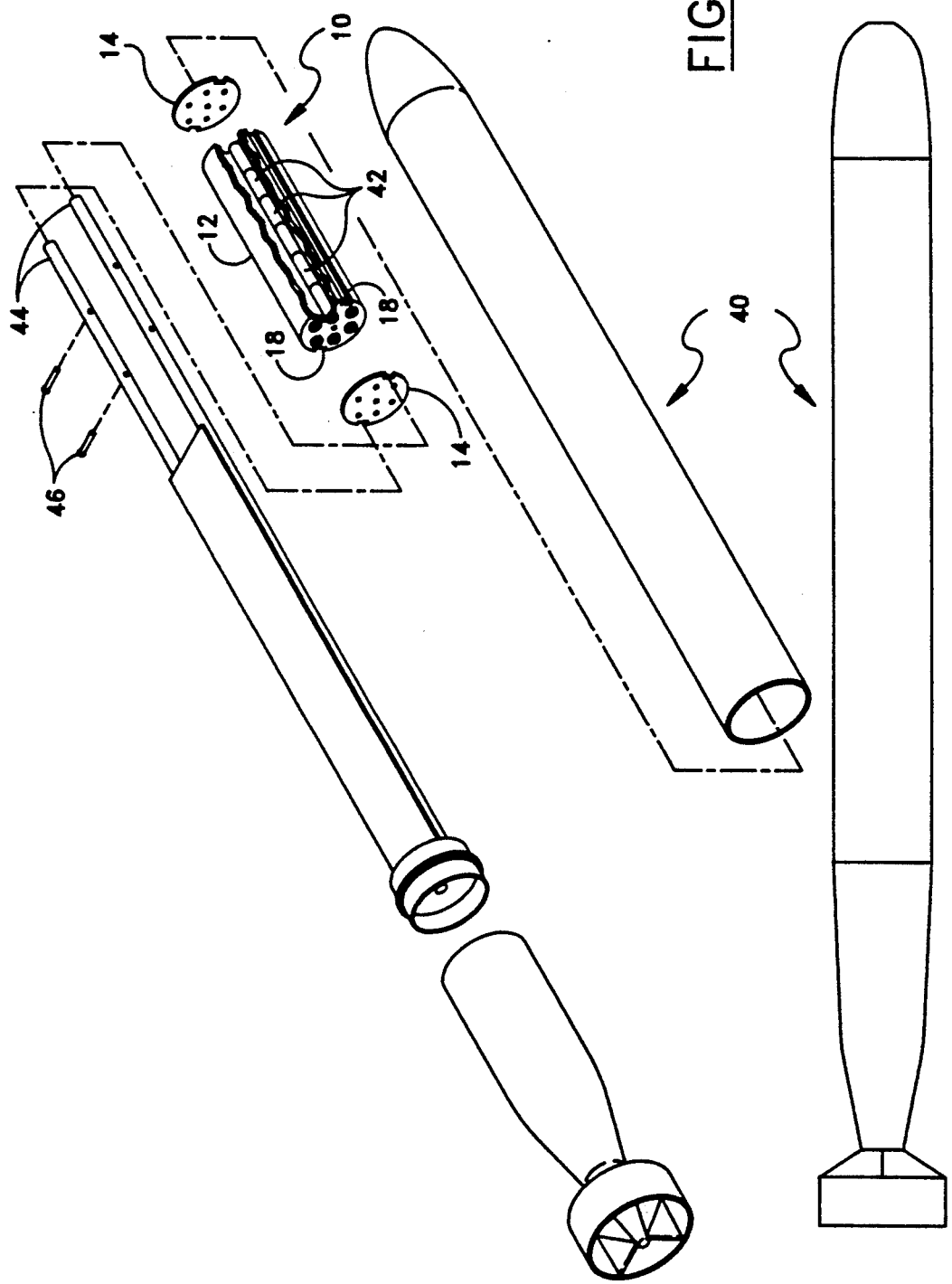
FIG. 2 shows a perspective view of the battery holder of FIG. 1 in use aboard a test device.

FIG. 2 shows battery holder 10 as mounted aboard a test device. The test device in this instance is an asynchronous acoustic source device 40. Batteries 42 are inserted in battery holder 10. Battery holder 10 is installed on mounting bars 44 by aligning mounting bars 44 with mounting grooves 18 and sliding holder 10 on acoustic source device 40. Mounting screws 46 are then tightened to retain holder 10.

FIGS. 3 through 7 diagram various end cap connector and lead configurations and the resulting electrical circuit obtained. In the electrical circuit diagrams, batteries are denoted generally as 42. The voltage calculations were made using the preferred embodiment of six battery chambers, each holding six size "AA" 1.5 volt battery cells.

FIG. 3 shows the battery holder end caps configured to provide six 9 volt power supplies and a circuit diagram for one 9 volt power supply.

FIG. 4 shows the battery holder end caps configured to provide three 18 volt power supplies and a circuit diagram for one 18 volt power supply.

FIG. 5 shows the battery holder end caps configured to provide one 27 volt power supply, one 18 volt power supply and one 9 volt power supply and a circuit diagram for one 27 volt power supply.

FIG. 6 shows the battery holder end caps configured to provide one 36 volt power supply and one 18 volt power supply and a circuit diagram for one 36 volt power supply.

FIG. 7 shows the battery holder end caps configured to provide one 54 volt power supply and a circuit diagram for the 54 volt power supply.

One advantage of this battery holder over the prior art is the increased durability of this battery holder because of the thickness of end caps 14 and body 12. Loss of resiliency caused by changing battery cells is eliminated because the battery holder can be opened and turned to allow spent battery cells to slide free from body 12. The thickness of body 12 and end caps 14 prevents deformation attributable to ohmic heating at high current loads.

This battery holder is suited to research and development environments because it can be readily reconfigured by rearranging power leads 32 and connector plates 34 to provide different voltages and currents. The chambers can be connected in series to provide high voltages or in parallel to provide a large current. Battery holder 10 can be removed from the test device by unscrewing power leads 32.

What has thus been described is a heavy duty battery holder which will withstand hostile environments, allow reconfiguration to provide different voltages and currents, and allow rapid removal and replacement of spent battery cells.

Obviously many modifications and variations of the present invention may become apparent in light of the above teachings. For example: metallic components can be used for the body and end caps if appropriate insulation is provided; ceramic components can be used to provide high heat resistance and electrical insulation; the number, configuration, and length of chambers may be varied to accommodate differing power needs; the diameter of the chambers can vary to allow use of larger or smaller battery cells; wires may be used instead of contact plates to connect chambers; and longer wires or plates may be used to electrically connect distal chambers.

In light of the above, it is therefore understood that within the scope of the appended claims, the invention may be practiced otherwise than as specifically described.

What is claimed is:

1. A battery holder comprising:
   a cylindrical body having an axis of revolution, and first and second ends each of said ends having a flat face disposed orthagonally thereon with respect to said axis of revolution and a plurality of cylindrical battery chambers spaced radially about said faces of the body and extending longitudinally through the body from said first end to said second end, each battery chamber being of a diameter and length to accommodate a plurality of battery cells connected in series;
   two end caps, each having a plurality of contact apertures therein and therethrough arranged radially with each contact aperture portioned in correspondence with one battery chamber;
   fastening means removably attaching said end caps to said first and second ends of said body thereby covering said battery chambers;
   contact springs disposed on each end cap on the body side thereof with each contact spring disposed at each of said contact apertures;

electrically conductive bolts passing through each of said contact apertures in said end caps and electrically connecting each contact spring; and electrically conductive plates removably engaged by said electrically conductive bolts on the exterior side of said end caps, said plates being positonable to select different voltages from the battery holder.

2. The battery holder according to claim 1 wherein the fastening means comprises fasteners passing through the end caps at fastening apertures disposed in the faces thereof and extending therethrough, said fasteners engaging the body at body fastening apertures in the faces thereof.

3. The battery holder of claim 2 further comprising at least two detachable electrically conductive leads capable of being removably fastened and electrically connected to any of said electrically conductive bolts.

4. The battery holder according to claim 3 wherein said body has two longitudinal mounting grooves opposite each other on either side of said body, and said end caps have two longitudinal mounting grooves opposite each other on either side of said end caps.

5. The battery holder according to claim 4 wherein said contact spring is an electrically conductive helical spring.

6. A battery holder comprising:

a cylindrical body having an axis of revolution, and first and second ends, each of said ends having a flat face disposed orthagonally thereon with respect to said axis of revolution with a plurality of cylindrical battery chambers spaced radially about said faces of the body and extending longitudinally through the body from said first end to said second end such that said body surrounding said chambers is substantially rigid and able to withstand heavy usage, each battery chamber being of a diameter and length to accommodate a plurality of standard battery cells connected in series, said body having two longitudinal mounting grooves opposite each other on the exterior surface of said body, and said body having fastening apertures in the faces thereof;

two removable disk shaped end caps with a plurality of contact apertures therein therethrough arranged radially with each contact aperture positioned in correspondence with one battery chamber, said end caps having mounting slots opposite each other corresponding to said mounting grooves on said body, and said end caps having fastening openings in the face thereof and extending therethrough;

at least two fasteners securing said end caps to said body by passing through said fastening opening in each end cap and engaging said body at the fastening aperture therein;

contact springs disposed on each end cap on the body side thereof with each contact spring disposed at each of said contact apertures;

electrically conductive bolts passing through each of said contact apertures in said end caps and electrically connecting each contact spring; and electrically conductive plates removably engaged by said electrically conductive bolts on the exterior side of said end caps, said plates being positonable to select different voltages from the battery holder.

7. The battery holder of claim 6 further comprising at least two detachable electrically conductive leads capable of being removably fastened and electrically connected to any of said electrically conductive bolts.

8. The battery holder according to claim 7 wherein said contact spring is a helical spring.

* * * * *